Patented May 31, 1949

2,471,938

UNITED STATES PATENT OFFICE 2,471,938

FERROUS SULFATE PRETREATMENT IN EMULSION POLYMERIZATION OF CONJUGATED DIOLEFINS

Willie W. Crouch and James E. Pritchard, Bartlesville, Okla., assignors to Phillips Petroleum Company, a corporation of Delaware No Drawing. Application January 5, 1945,
Serial No. 571,540

10 Claims. (Cl. 260—86.5)

This invention relates to a process for the polymerization of polymerizable organic compounds. In one of its more specific aspects it relates to the polymerization of conjugated diolefins including copolymerization with a comonomer. This invention is particularly applicable to polymerization in an aqueous emulsion for the production of synthetic rubber.

In accordance with this invention, the monomeric material is treated prior to polymerization with a prepolymerization treating agent. This prepolymerization treatment is particularly effective for emulsion polymerization effecting an increase in the rate of polymerization reaction and production of a product of superior quality.

It is generally known that butadiene will undergo polymerization and/or copolymerization with selected polymerizable compounds such as styrene, acrylonitrile and the like by subjecting an aqueous emulsion of such components in which soap is used as an emulsifying agent, in the presence of modifier, to the action of a catalyst having oxidizing characteristics. In emulsion polymerization in which a recipe of the Buna-S type is employed, a reaction time of about 12.5 hours is required to produce a yield of about 75 parts of dried polymer, based on 100 parts of monomers charged, when the reaction mixture is constantly agitated and the temperature is maintained at about 50° C. In commercial operations the polymerization is usually stopped at this stage and the product recovered by suitable means.

In polymerization systems of the type described certain advantages are to be gained by lowering the operating temperature. For example, a reaction carried out at about 40° C. yields a polymer that possesses improved processing characteristics, greater resistance to cut growth and increased tensile strength and elongation. However, a decrease in the reaction temperature would necessitate an increase in the polymerization time with the result that the output of a given plant would be diminished to the extent that the process would be rendered inoperable or the operating costs would be increased to a point where the process would not be economically feasible. Furthermore, an increase in the amount of modifier charged is necessary when longer reaction periods are employed.

The use of activators in emulsion polymerizations catalyzed by oxidizing agents such as potassium persulfate has been proposed. Among the materials suggested may be mentioned certain iron salts which act as promoters if the reaction conditions are properly controlled. For example, potassium ferricyanide is regarded as suitable for the purpose but little or no activation is accomplished unless the pH of the solution is kept at about 11.0 or higher. However, the corrosive action of alkali when glass-lined reaction chambers are used coupled with the poor quality of the polymer produced make the use of an activator of this type inadvisable.

An object of this invention is to provide a process for the polymerization of organic compounds.

Another object is to provide an improved process for the production of synthetic rubber.

Another object is to provide an improved process for the emulsion polymerization of monomeric material comprising an aliphatic conjugated diolefin.

Still another object is to provide such a process in which the polymerization reaction is accelerated by pretreatment of the monomeric material.

We have found that the presence of a small quantity of selected salts in a recipe of the Buna-S type greatly increases the rate of polymerization if such compounds are added to the hydrocarbon components, modifier and soap solution and the mixture agitated for a short time prior to the addition of the oxidizing catalyst. It should be pointed out that the present treatment does not alter the catalyst requirements of emulsion polymerization stystems, but that the addition of such catalyst to the system must be deferred until our beneficial pretreatment has been completed. Among the agents which have been found effective for this purpose are the ferrous salts, particularly ferrous sulfate. Through the use of these prepolymerization activators the polymerization rate may be increased to such an extent that the reaction temperature can be lowered appreciably and yields obtained comparable to those obtained at 50° C. when the ordinary recipe is employed. On the other hand, if the temperature is held at about 50° C. it is possible to effect the desired conversion at a greatly reduced reaction time if the preferred activators of this invention are present.

In a specific embodiment of the present invention, a reactor is charged with 75 parts by weight of buadiene, 25 parts styrene, 5 parts soap, 170 parts water, 0.50 part dodecyl mercaptan and 0.30 part ferrous sulfate heptahydrate (0.16 part $FeSO_4$). The emulsion is continuously agitated for one hour while the temperature is maintained at about 50° C. after which 0.30 part of potassium persulfate in 10 parts of water is added. The agitation is continued and the reaction is allowed to proceed while the temperature is held at about 50° C. or lower until the required conversion is attained. At the conclusion of the reaction period any unconverted reactants are recovered by conventional means, the latex is mixed with an oxidation inhibitor such as phenyl-beta-naphthylamine and the product is broken out of the emulsion by a suitable coagulating agent such as aluminum sulfate solution. The polymer is dried by conventional means until substantially free from water.

Since the nature of the monomers, the type of soap used in preparing the emulsion, the particular oxidizing agent used as the catalyst and the treating temperature all have a bearing on the amount of our preferred activators required for optimum results, each polymerization system must be considered as a special case and the optimum proportion of pretreating agent determined experimentally. In general, the ferrous sulfate activators are effective in virtually all emulsion polymerization systems employing catalysts having oxidizing characteristics when employed in quantities equivalent to about 0.01 to about 0.5 part based on 100 parts of monomers charged. As a specific illustration of the procedure employed in determining the effective concentration range of our ferrous sulfate activator, the recipe given above is pretreated for 1 hour at 50° C. with varying quantities of ferrous sulfate. At the conclusion of the pretreatment sufficient potassium persulfate catalyst is added to give an effective catalyst concentration ranging from 0.3 to 0.35 part, assuming complete reaction of the ferrous sulfate with the catalyst during the polymerization proper. Polymerization is carried out for a period of 6 hours after which the yield of polymer is determined. Data from a series of such determinations are given below:

| Run No. | $FeSO_4$, Parts | $K_2S_2O_8$, Parts | Monomer Conversion, Per Cent | Reaction Rate Increase, Per Cent |
|---|---|---|---|---|
| 1 | None | 0.30 | 25.1 | |
| 2 | 0.06 | 0.37 | 40.8 | 63 |
| 3 | 0.11 | 0.45 | 54.4 | 117 |
| 4 | 0.16 | 0.45 | 69.2 | 175 |
| 5 | 0.27 | 0.60 | 46.1 | 84 |
| 6 | 0.41 | 0.67 | 41.3 | 65 |

In this particular system the optimum concentration of ferrous sulfate is about 0.16 part per 100 parts of monomers charged.

The exact nature of the chemistry involved in the present process and the variables influencing the effectiveness of our novel activators are not entirely understood; however, brief consideration of certain factors may be of value in explaining the process and differentiating it from polymerization processes. We have found that the nature of the soap used in preparing the emulsion is an important variable. Systems emulsified with a completely saturated soap such as pure sodium stearate do not show an appreciable response to the treatment of this process while systems using commercially available soaps such as "Ivory Flakes" having appreciable iodine numbers are greatly benefited by the present process. Experimental data conclusively prove that the beneficial effect of our reducing agents is realized only when said reducing agents are agitated with the recipe prior to the addition of the polymerization catalyst. We have further established that the oxidizing catalyst must be added to the treated emulsion in such quantity as to permit reaction with the reducing agent and still provide an excess for catalytic purposes. It has also been established that the ferrous iron salts of this invention are devoid of any catalytic effect on the polymerization per se. It would appear that during the preliminary reaction period certain inhibitors are destroyed which are present in reaction mixture thereby allowing the reaction to proceed more rapidly by virtue of their absence when the potassium persulfate or other catalyst is added. In general polymerization systems which are contaminated by air and/or oxygen, as in normal polymerization procedure, show greatest response when treated according to the present process.

The following specific examples are offered to further illustrate the present invention. In all of the examples the proportions given are by weight.

*Example I*

In order to evaluate the effect of ferrous sulfate as an activator in emulsion polymerization systems two experiments were set up, one of which contained the activator. Each polymerization reactor was charged with 75 parts butadiene, 25 parts styrene, 5 parts soap ("Ivory Flakes") and 170 parts distilled water. In addition, 0.28 part tertiary $C_{12}$ mercaptan was incorporated into the emulsion to serve as a modifying agent. To the first reactor was added 0.30 part ferrous sulfate heptahydrate (0.16 part $FeSO_4$). Each mixture was warmed to 50° C. and agitated for one hour at that temperature after which a solution of 0.30 part potassium persulfate in 10 parts water was added and agitation was continued for six hours at the same temperature. Subsequent to the removal of unreacted butadiene, the latex was mixed with 2.5 parts phenyl-beta-naphthylamine antioxidant and the polymer was coagulated with aluminum sulfate solution. The product was dried until substantially free from water. The yield of polymer, based on the weight of monomers charged, was 65.3 parts in the experiment containing the activator and 25.1 parts in the system in which ferrous sulfate had not been employed.

*Example II*

A polymerization reactor was charged with 75 parts butadiene, 25 parts styrene, 5 parts ("Ivory Flakes") soap, 0.28 part tertiary $C_{12}$ mercaptan, 0.30 part ferrous sulfate heptahydrate (0.16 part $FeSO_4$) and 170 parts distilled water. The reaction mixture was agitated two hours at 50° C. after which 0.30 part potassium persulfate in 10 parts of water was introduced and the reaction allowed to proceed six hours at the same temperature. Agitation was continued during the entire reaction period. The unreacted butadiene was removed and the polymer recovered and evaluated as in Example I. The yield of dried polymer, based on the weight of monomers charged, was 71.6 parts as compared with 25.1 parts obtained from an untreated control run.

Example III

The recipe shown in Example II was employed and the reaction mixture shaken for one hour prior to the addition of 0.45 part potassium persulfate in 10 parts of water. The reaction was allowed to proceed six hours after the addition of the catalyst. The yield of polymer was 69.2 parts, an increase of 44.5 parts over the untreated control with the same reaction period.

Example IV

The recipe of Example II was used except that 0.40 part of commercial grade of primary dodecyl mercaptan was employed as modifier instead of 0.28 part tertiary $C_{12}$ mercaptan. The reaction mixture was agitated for one hour at 50° C. after which 0.30 part potassium persulfate in 10 parts water was added. Agitation was continued for six hours and the polymer was coagulated and dried. The yield obtained was 72.3 parts which is a reaction rate increase of 188 per cent over the untreated control. This experiment indicates that the present process is substantially independent of the type of mercaptan employed as the modifying agent in the recipe.

Example V

To show the effectiveness of ferrous sulfate pretreatment in the absence of polymerization catalyst, 0.16 part ferrous sulfate and 0.30 part potassium persulfate catalyst were added to the recipe of Example II. Polymerization was immediately initiated and allowed to proceed for 6 hours at 52° C. The yield of dry polymer amounted to 34.5 parts based on 100 parts of monomers charged. In another experiment the ferrous sulfate was agitated with the recipe for one hour prior to the addition of the persulfate. Six hours subsequent to the addition of potassium persulfate, 65.3 parts of polymeric product were recovered. Reaction conditions were substantially the same in both runs. A reaction rate increase of about 90 per cent was realized as a result of the pretreatment procedure.

We claim:

1. A process for the production of a polymer from a polymerizable organic monomeric material comprising a conjugated diolefin, which comprises forming an aqueous emulsion of said monomeric material, admixing with said aqueous emulsion a polymerization activator consisting of ferrous sulfate, in an amount between about 0.01 to about 0.5 part per 100 parts of monomeric material, and maintaining said admixture free from a polymerization catalyst for a pretreatment period of at least about one hour, subsequently adding to said admixture an oxidizing-type polymerization catalyst and effecting a polymerization of said monomer, and subsequently recovering a polymer so produced.

2. In a process for the production of synthetic rubber by polymerization in an aqueous emulsion of a monomeric material comprising a conjugated diolefin, the improvement which comprises incorporating in such an aqueous emulsion, prior to the addition of a polymerization catalyst, a polymerization activator comprising ferrous sulfate in an amount between 0.01 and 0.5 part per 100 parts of said monomeric material, maintaining said mixture free from a polymerization catalyst for a pretreatment period of about one hour, subsequently adding to said mixture an oxidizing-type polymerization catalyst in an amount sufficient to initiate polymerization of said monomeric material, and subsequently recovering a synthetic rubber polymer so produced.

3. In a process for the production of synthetic rubber by polymerization of an aqueous emulsion of a monomeric material comprising 1,3-butadiene, the improvement which comprises incorporating in such an aqueous emulsion, prior to the addition of a polymerization catalyst, a polymerization activator comprising ferrous sulfate in an amount between 0.01 and 0.5 part per 100 parts of monomeric material, maintaining said mixture free from a polymerization catalyst for a pretreatment period of about one hour, subsequently adding to said mixture an oxidizing-type polymerization catalyst in an amount sufficient to initiate polymerization of said monomeric material, and subsequently recovering a synthetic rubber polymer so produced.

4. In a process for the production of synthetic rubber by polymerization of an aqueous emulsion of a monomeric material comprising 1,3-butadiene and styrene, the improvement which comprises incorporating in such an aqueous emulsion, prior to the addition of a polymerization catalyst, a polymerization activator comprising ferrous sulfate in an amount between 0.01 and 0.5 part per 100 parts of said monomeric material, maintaining said mixture free from a polymerization catalyst for a pretreatment period of about one hour, subsequently adding to said mixture potassium persulfate in an amount sufficient to initiate polymerization of said monomeric material, and subsequently recovering a synthetic rubber polymer so produced.

5. In a process for the production of synthetic rubber by polymerization in an aqueous emulsion of a monomeric material comprising a conjugated diolefin, the improvement which comprises incorporating in such an aqueous emulsion, prior to the addition of a polymerization catalyst, a polymerization activator comprising a water-soluble ferrous salt in an amount between 0.01 and 0.5 part per 100 parts of said monomeric material, maintaining said mixture free from a polymerization catalyst for a pretreatment period of about one hour, subsequently adding to said mixture potassium persulfate in an amount sufficient to initiate polymerization of said monomeric material, and subsequently recovering a synthetic rubber polymer so produced.

6. In a process for the catalytic polymerization in an aqueous emulsion of a monomeric material comprising a conjugated diolefin, the improvement which comprises incorporating in such an aqueous emulsion, prior to the addition of a polymerization catalyst, a ferrous salt as a prepolymerization treating agent, maintaining a resulting mixture free from polymerization catalyst for a pretreatment period, subsequently adding to said pretreated emulsion an oxidizing-type polymerization catalyst and effecting a polymerization.

7. The improvement of claim 6 wherein said ferrous salt is added in an amount between 0.01 and 0.5 part per 100 parts of said monomeric material.

8. The improvement of claim 7 wherein said ferrous salt is ferrous sulfate.

9. The improvement of claim 6 wherein said monomeric material comprises a major amount of 1,3-butadiene and a minor amount of styrene.

10. A process for the production of synthetic rubber, which comprises forming an aqueous emulsion comprising 1,3-butadiene and a smaller amount of styrene and ferrous sulfate in an amount between 0.01 and 0.5 part per 100 parts of total 1,3-butadiene and styrene, maintaining said emulsion free from a polymerization catalyst for a pretreatment period, subsequently adding to said pretreated emulsion an oxidizing agent as a polymerization catalyst in an amount sufficient to initiate polymerization, and effecting a polymerization, and recovering from effluents of said polymerization a synthetic rubber polymer so produced.

WILLIE W. CROUCH.
JAMES E. PRITCHARD.

REFERENCES CITED

The following references are of record in the file of this patent:

UNITED STATES PATENTS

| Number | Name | Date |
|---|---|---|
| 2,380,473 | Stewart | July 31, 1945 |
| 2,380,476 | Stewart | July 31, 1945 |
| 2,388,373 | Stewart | Nov. 6, 1945 |
| 2,394,406 | Schoenfeld | Feb. 5, 1946 |